United States Patent [19]
Moessner
[11] 4,055,880
[45] Nov. 1, 1977

[54] KEY ASSEMBLY TOOL

[75] Inventor: Frank G. Moessner, Pointe Claire, Canada
[73] Assignee: Unican Security Systems, Ltd., Montreal, Canada

[21] Appl. No.: 726,998
[22] Filed: Sept. 27, 1976
[51] Int. Cl.² ..... B23P 19/04
[52] U.S. Cl. ..... 29/267
[58] Field of Search ..... 29/267, 268; 81/352, 81/353, 355, 362, 363

[56] References Cited

U.S. PATENT DOCUMENTS

| | | | |
|---|---|---|---|
| 945,442 | 1/1910 | Bowers | 29/267 |
| 3,785,037 | 1/1974 | Erdmann | 29/268 |

*Primary Examiner*—James L. Jones, Jr.
*Attorney, Agent, or Firm*—Ira Milton Jones & Associates

[57] ABSTRACT

A pincer-like tool for attaching a selected slotted plastic head to the shank of a key and for detaching the head therefrom. The tool has a pair of pivotally connected members, one of which provides the body of the tool and has opposite flat-surfaced sides, each of which is designed to receive and hold a slotted plastic head in position to have the shank of a key forced into its slot or expelled therefrom — depending upon which of the two sides of the body the head is placed on — by the advance of a carriage that is slidably mounted on the body; the other one of the pivotally connected members being a short and long armed bell crank lever having its short arm drivingly connected with the carriage and its long arm overlying a handle on the body to form a pair of pincers which, upon being gripped and squeezed together, advance the carriage.

14 Claims, 6 Drawing Figures

Fig. 3

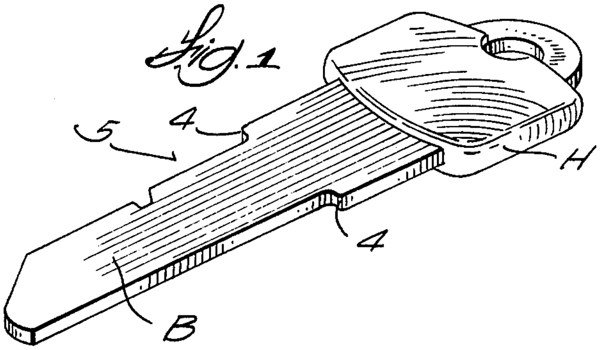
Fig. 1
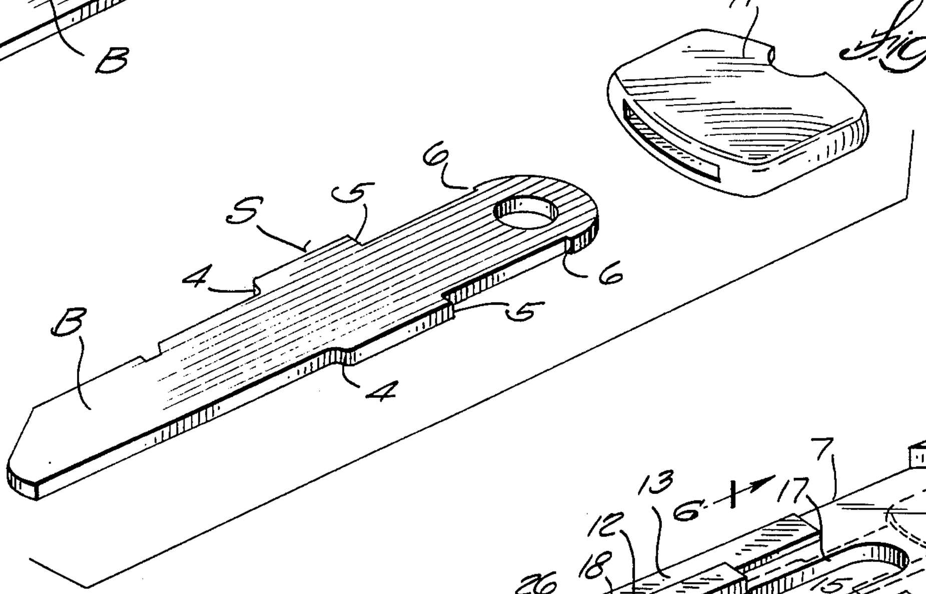
Fig. 2
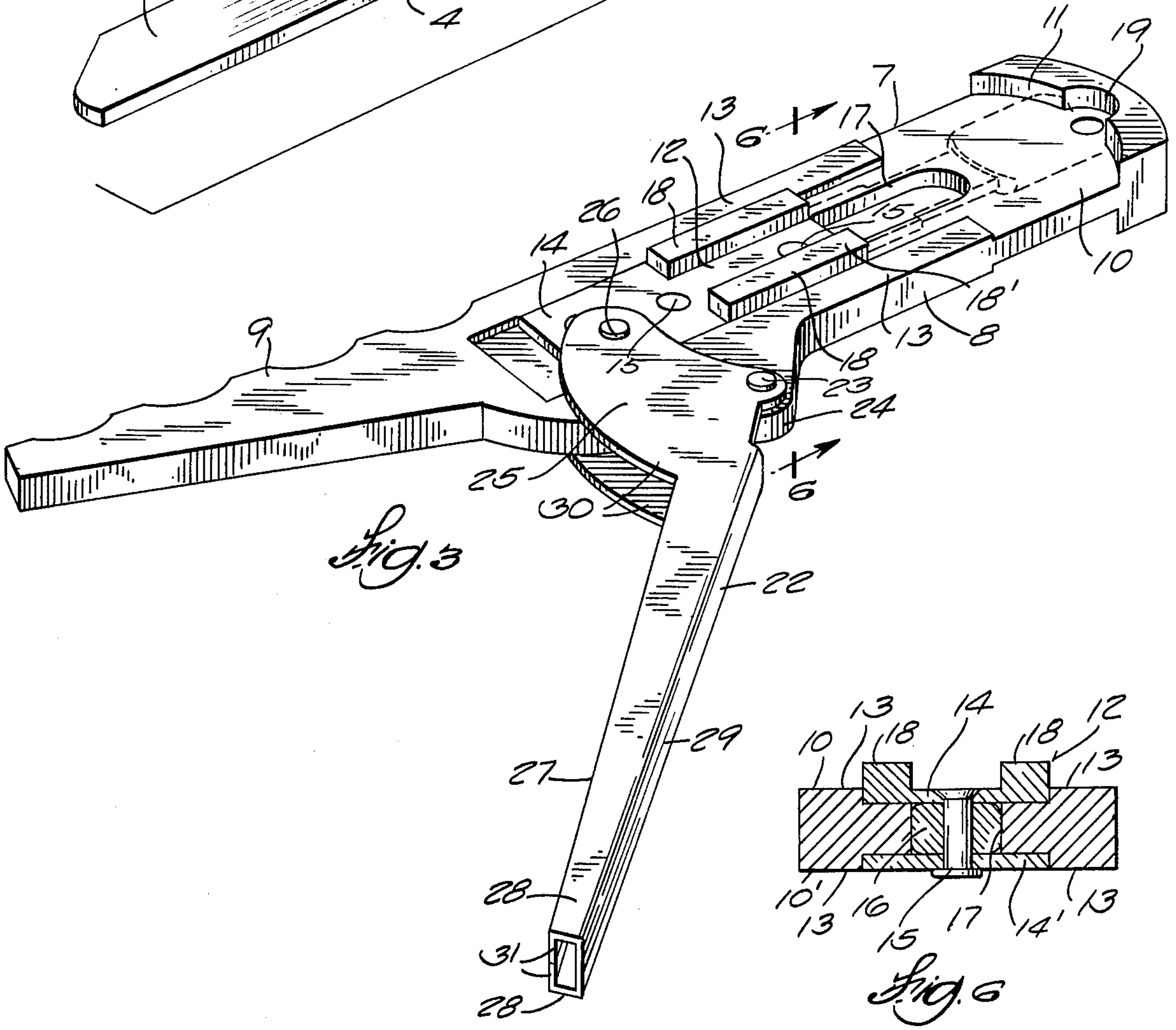
Fig. 3
Fig. 6

KEY ASSEMBLY TOOL

This invention has as its purpose to provide an improved tool for assembling slotted plastic heads with the metal shanks of keys.

For quite some time, keys for tumbler locks have been color coded to identify them with the locks they open. The most convenient way of doing this is by providing different colored plastic heads that can be detachably secured to the shanks of the keys. For this purpose, the plastic heads are slotted and the shanks of the keys have their head end portions shaped and dimensioned to snugly fit the slot in the plastic heads. In fact, the outer end portion of the key shank, which is apertured as is customary, usually has small though well defined inwardly facing shoulders to snap over the edges of the slot in the plastic head and prevent accidental or unintentional separation of the head from the key.

In assembling the head and key, the latter is forced into the slot in the head. Obviously, this impaling operation is best performed with a tool specifically designed for the purpose, but the tools heretofore available left much to be desired. There has been a real need for a practical and efficient tool with which a selected plastic slotted key head can be quickly and easily attached to the shank of a key or detached therefrom. This invention supplies that need.

As will be more fully described hereinafter, the invention resides in a tool that has a body having a head-supporting surface with an abutment rising therefrom to receive and support a head, with its slot parallel to said supporting surface and perpendicular to said abutment; a carriage slidably mounted on the body; means constraining the carriage to linear advance towards and retraction from said abutment; key shank engaging means on said carriage to so engage the shank of a key that, upon advance of the carriage towards said abutment, the head end portion of the key shank is forced to move endwise in one direction through the slot of a head in position on the body in front of said abutment; and manually operable motion-producing means reacting between the body and the carriage for advancing and retracting the carriage.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 1 is a perspective view of a key of the type with which this invention is concerned;

FIG. 2 is a perspective view of the component parts of the key — that is, its shank and head, disassembled;

FIG. 3 is a perspective view of the tool of this invention, illustrating the structure thereof by which the shank of the key and its head are assembled;

FIG. 6 is a cross sectional view through FIG. 3 on the plane of the line 6—6.

Figure 4:
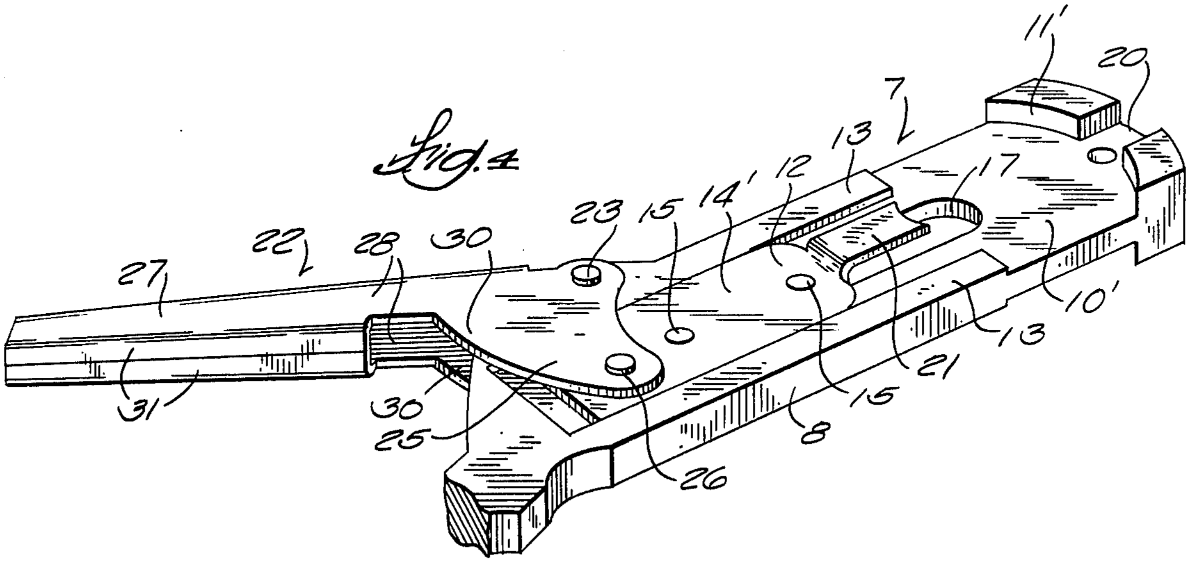
FIG. 4 is a perspective view of the opposite side of the tool at which its parts coact to detach the shank of the key from the head.

Referring to the drawings and, for purposes of nomenclature, note that the key shown assembled in FIG. 1 and disassembled in FIG. 2, comprises a shank S having a bitted blade B and a slotted plastic head H into which the outer end portion of the shank is inserted. As is customary, at the base of the blade there are well defined shoulders 4 and, beyond these, shoulders 5 which limit insertion of the shank into the slot through the head. Similar shoulders 6 on the outer end portions of the shank snap over the adjacent edges of the slot during assembly of the key to prevent accidental or unintentional disassembly.

Figure 5:
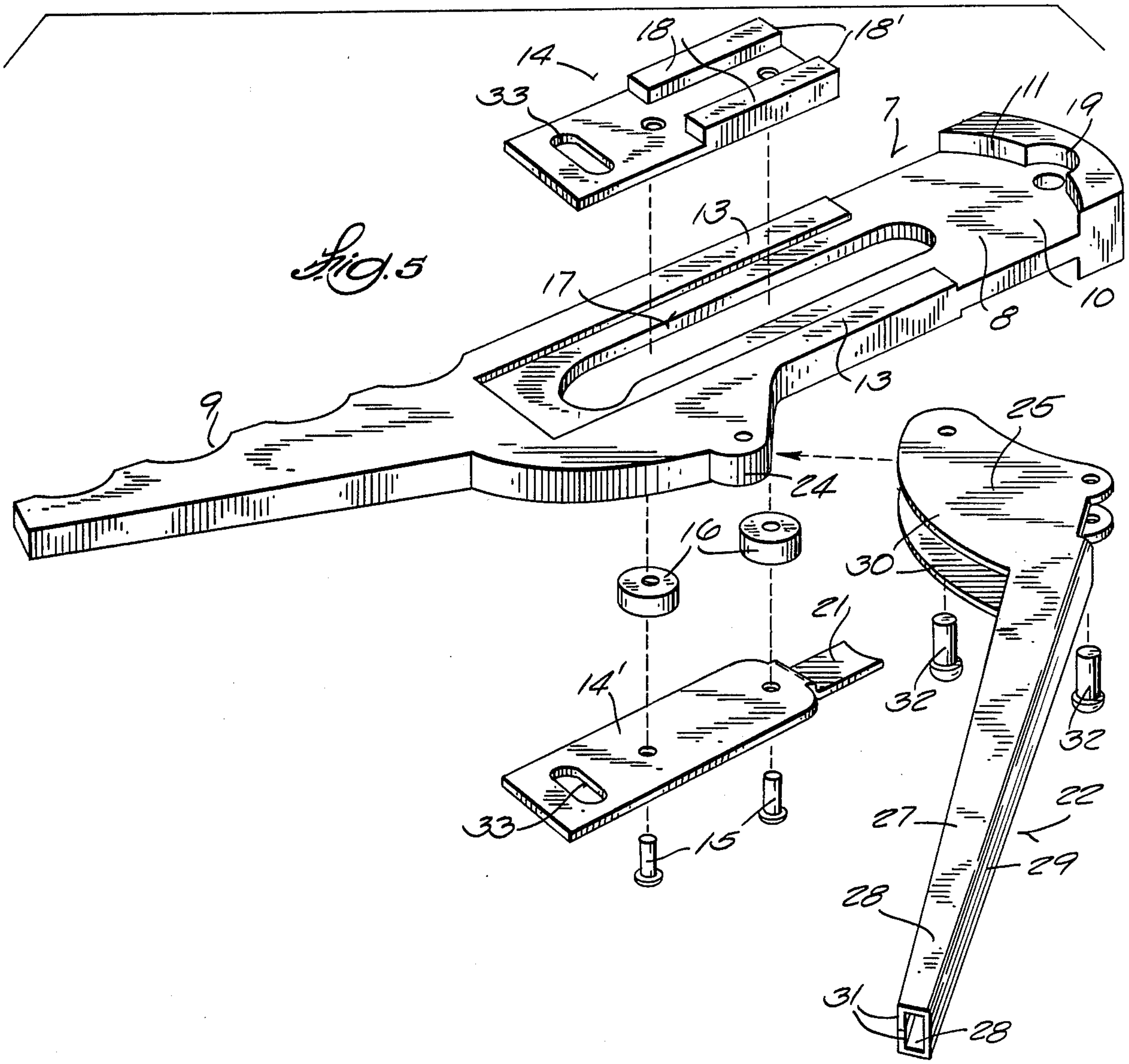
FIG. 5 is an exploded perspective view of the component parts of the tool.

With reference to the tool, the numeral 7 designates its body, which — as best seen in FIG. 5 — has a main section 8 on which the mechanism of the tool is located, and a handle 9 projecting therefrom. The main body section has opposite flat, substantially rectangular parallel surfaces 10—10′ with abutments 11—11′ rising therefrom.

Slidably mounted on the main section 8 of the body is a carriage 12 which is constrained to linear motion towards and from the abutments 11—11′ by a pair of parallel guide rails 13 extending along the side edges of each of the opposite flat sides of the body. The carriage comprises a pair of flat-sided bar-like members 14—14′ connected with one another by a pair of rivets 15 that pass through spacers 16 by which the bar-like members are held spaced apart a distance slightly greater than the thickness of the main section of the body so that the bar-like members slide freely over the surfaces 10—10′.

An elongated hole 17 through the main section of the body accommodates the spacers 16, and by virtue of the width of the bar-like members being just slightly less than the distance between the guide rails 13 and their thickness being substantially equal to the height of the guide rails, the outer surfaces of the guide rails and the bar-like members at each side of the body form substantially continuous coplanar surfaces.

At the side of the tool at which the surface 10 is located, the carriage and the abutment 11 coact to force the shank S of a key into the slot of a selected plastic head H upon advance of the carriage towards the abutment. For that purpose, the side of the abutment facing the carriage is concavely arcuate to fit the convexly curved outer edge of any selected key head, it being understood that except for color, all heads are alike.

The selected head is laid on the surface 10 with its outer edge against the concavely curved side of the abutment, and the shank of a key to be fitted with the selected head is laid onto the bar-like member 14 that constitutes the adjacent portion of the carriage, between a pair of sharply defined ridges or fences 18 that project upwardly from the side edge portions of the member 14. By these ridges or fences, the shank of the key is held against lateral displacement from the carriage and, by the engagement of the shoulders 4 at the base of the shank with the ends 18′ of the ridges or fences, the shank is constrained to move with the carriage as it is advanced towards the abutment.

Attention is directed to the fact that by virtue of the thickness of the bar-like member 14, the surface thereof on which the shank of the key is laid — and hence the underside of the projecting head end portion of the shank 13 is spaced from the surface 10 an amount to achieve alignment of the shank with the mouth of the slot in the head. Accordingly, as the carriage is advanced, the rounded outer end of the key shank is driven into the slotted head. The shoulders 5 on the side edges of the key shank limit its insertion into the head, and — at that point — the small shoulders 6 snap over the edges of the slot in the head and the rounded end of the shank protrudes beyond the outer edge of the head just far enough to expose the hole in the shank. To accommodate this projection of the shank beyond the outer edge of the head, the concavely curved side of the abutment has a central depression 19.

The manner in which the carriage is advanced will be described after the immediately following description of the structure of the tool by which the shank of a key can be detached from its head. This is done at the side of the tool at which the surface 10' is located, as illustrated in FIG. 5.

However, before proceeding it should be noted that the flat surfaces 10 and 10' are properly identifiable as head-supporting surfaces, inasmuch as, in each case, the head of the key — whether it is to be attached or detached — is laid thereon preparatory to the operation to be performed.

With particular reference to FIG. 5, note that the abutment 11' is medially interrupted to provide a passage 20 extending from the concavely curved inner side of the abutment to its opposite outer side, and that the bar-like member 14' has a finger 21 projecting from its front end. This finger has a cross sectional side and shape to permit its entry into the slot in the key heads, and is offset from the plane of the member 14' by an amount approximately half the thickness of the plastic heads. Accordingly, the finger will be coplanar with the shank of a key laid on the surface 10' with its blade projecting through the passage 20 and the inner edge of its head bearing against the abutment 11'.

With the key in position on the tool, advance of the carriage will bring the outer end of the finger 21 into engagement with the rounded end of the shank that protrudes from the head, and by continued advance of the carriage, the shank of the key will be dislodged from the head, since the size and shape of the finger permits it to enter the slot in the head.

Reciprocatory movement of the carriage is effected by motion-producing means reacting between the body and the carriage. That motion producing means comprises a long and short armed bell crank lever 22 pivotally connected as at 23 to a laterally projecting portion 24 of the main section 8 of the body. The short arm 25 of this lever has a motion-imparting connection 26 with the carriage and its long arm 27 overlies the handle 9 that projects from the main section of the body. In effect, the long arm of the bell crank lever and the handle form a pair of pincers which, upon being grasped and squeezed together, impart advancing motion to the carriage — and, obviously, movement of the long arm of the bell crank lever away from the handle, retracts the carriage.

Attention is directed to the novel construction of the bell crank lever 22. It is a sheet metal stamping with parallel flat side walls 28 joined by an outer center wall 29. The side walls 28 are shaped to provide a pair of parallel flat flanges 30 which embrace the assembled body and carriage and form the short arm 25 of the lever. Outwardly of the flanges 30 the side walls 28 have their inner edge portions 31 turned in towards one another and brought into edge-to-edge contact, to thus impart a neat cross sectional shape to the long arm of the lever.

The motion imparting connection 26 between the short arm of the bell crank lever and the carriage is formed by a rivet 32 which connects the flanges 30 and passes through aligned transversely extending slots 33 in the bar-like members 14—14' and through the elongated hole 17 in the main section 8 of the body, which hole is widened at its inner end to accommodate the arcuate travel of the rivet 32 as the bell crank lever is rocked to retract the carriage. Collision of the rivet with an edge of the hole 17 defines the fully retracted position of the carriage; and the limit of its advance is defined by collision of the inturned edge portions 31 at the underside of the long arm of the lever with the adjacent edge of the body.

Those skilled in the art will appreciate that the invention can be embodied in forms other than as herein disclosed for purposes of illustration.

I claim:

1. A tool for attaching a slotted head to or detaching it from the head end portion of the shank of a key, comprising:

A. a body having an upwardly facing head-supporting surface with an abutment rising therefrom to receive and support a head with its slot parallel to said supporting surface and perpendicular to said abutment;

B. a carriage slidably mounted on the body, said carriage having a longitudinal axis, an upwardly facing key shank supporting surface and a front end facing said abutment;

C. means constraining the carriage to linear advance along a path parallel to its longitudinal axis towards and retraction from said abutment;

D. key shank engaging means on said carriage by which the shank of a key laid on its upwardly facing surface is held and positioned on the carriage with its head end portion protruding beyond the front end of the carriage in line with the slot of a head in position on the upwardly facing head-supporting surface of the body in front of said abutment, so that as the key shank is advanced by the carriage its protruding head end portion is driven into the slotted head; and E. manually operable motion-producing means reacting between the body and the carriage for advancing and retracting the carriage.

2. The tool defined by claim 1, wherein said key shank engaging means includes sharply defined spaced apart longitudinally extending ridges to engage the opposite edges of the shank of a key which is to be assembled with a head in position on the body in front of said abutment, and thereby hold the same against lateral displacement as it is moved towards and into the slot in the head by advance of the carriage.

3. The tool defined by claim 1, wherein the abutment rising from the head-supporting surface is medially interrupted.

and wherein said key shank engaging means on the carriage includes a finger overlying the head-supporting surface and of a size and shape permitting its entry into the slot in a key head, so that upon placement of a headed key on said head-supporting surface with its head bearing against the abutment and its blade projecting through the interruption in the abutment, the shank of the key can be pushed out of the slot in the head by advance of the carriage.

4. The tool defined by claim 1, wherein said head-supporting surface and the abutment rising therefrom is duplicated at each of two opposite sides of the body, but wherein one of said abutments is medially interrupted, wherein the carriage has a portion thereof at each of said opposite sides of the body and has key engaging means on each of said portions, wherein the key engaging means at the side of the body at which the medially interrupted abutment is located is a finger projecting from the carriage and overlying the adjacent headsupporting surface, said finger having a cross sectional size and shape permitting its entry into the slot in a key head, so that upon placement of a headed key on said adjacent head-supporting surface with its head bearing against the medially interrupted abutment and its blade protruding through the interruption in the abutment, the shank of the key can be pushed out of the slot in the head by advance of the carriage, and further characterized by:

means on the portion of the carriage at the other side of the body to receive and embrace the shank of a key which is to be assembled with a head in position on the adjacent head-supporting surface in front of the abutment rising therefrom, so that the shank of the key is held against lateral displacement as it is moved toward and into the slot in the head by advance of the carriage.

5. The tool defined by claim 1, further characterized by:

a part on said body forming one of a pair of pincers; and wherein said manually operable motion producing means comprises 1. a short and long armed bell crank lever pivoted to the body with the long arm thereof movable towards and from said part on the body to form the other one of the pair of pincers, and
2. means forming a motion-transmitting connection between the short arm of the bell crank lever and said carriage.

6. The tool defined by claim 4, wherein the carriage comprises a pair of elongated bar-like members, one overlying each of the opposite sides of the body, and wherein the means on the carriage to receive and embrace the shank of a key comprises:

a pair of sharply defined parallel ridges rising from one of the bar-like members that are spaced apart a distance to snugly receive the shank of a key therebetween.

7. The tool defined by claim 6, wherein the leading ends of said ridges as the carriage advances are the key-engaging means of claim 1, in that they are engageable with the customary shoulders at the base of the shank of a key in position between said ridges.

8. The tool defined by claim 4, wherein the body has an elongated hole therethrough opening to said opposite sides thereof, further characterized in that:

the means constraining the carriage to linear advance towards and retraction from said abutment comprises a pair of parallel rails projecting from each of the opposite sides of the body parallel with and laterally outward of said elongated hole;

and further characterized in that the carriage comprises a pair of elongated bar-like members, one overlying each of said oppisite sides of the body with its side edges slidably engaged with the adjacent parallel rails; and securement means passing through said elongated hole and connecting said bar-like members with one another.

9. The tool defined by claim 8, wherein said motion-transmitting connection comprises:

1. a pin fixed to the short arm of the bell crank level, and
2. a crosswise extending slot in each of said bar-like members in which said pin is slidably received.

10. The tool defined by claim 8, wherein said means for advancing and retracting the carriage comprises a long and short armed bell crank lever pivoted to the body and a motion-transmitting connection between the short arm of said lever and the carriage, wherein the short arm of the bell crank lever comprises spaced apart parallel flanges between which the adjacent portion of the body and the adjacent portions of the bar-like members are received; and wherein the means providing the motin-transmitting connection between the short arm of the bell crank lever and the carriage comprises 1. a pin passing through the elongated hole in the body with its ends fixed to said flanges of the bell crank lever, and 2. identical crosswise extending slots in said bar-like members in which said pin is received.

11. The tool defined by claim 10, wherein the outer faces of those portions of the bar-like members that are embraced by the flanges of the bell crank lever are coplanar with the adjacent surfaces of the body, and said flanges being flat and slidably overlying said coplanar faces of the bar-like members and of the body.

12. The tool defined by claim 10, wherein the body has a handle portion positioned to coact with the long arm of the bell crank lever in forming a pair of pincers which upon being squeezed together effect advance of the carriage.

13. The tool defined by claim 10, wherein said bell crank lever is a metal stamping with the portions thereof that form said flanges being extended along the long arm of the lever to provide side walls therefor.

14. The tool defined by claim 13, wherein the body has a handle portion positioned to coact with the long arm of the bell crank lever in forming a pair of pincers which upon being squeezed together effect advance of the carriage.

* * * * *